July 30, 1946.  E. J. POITRAS ET AL  2,405,051

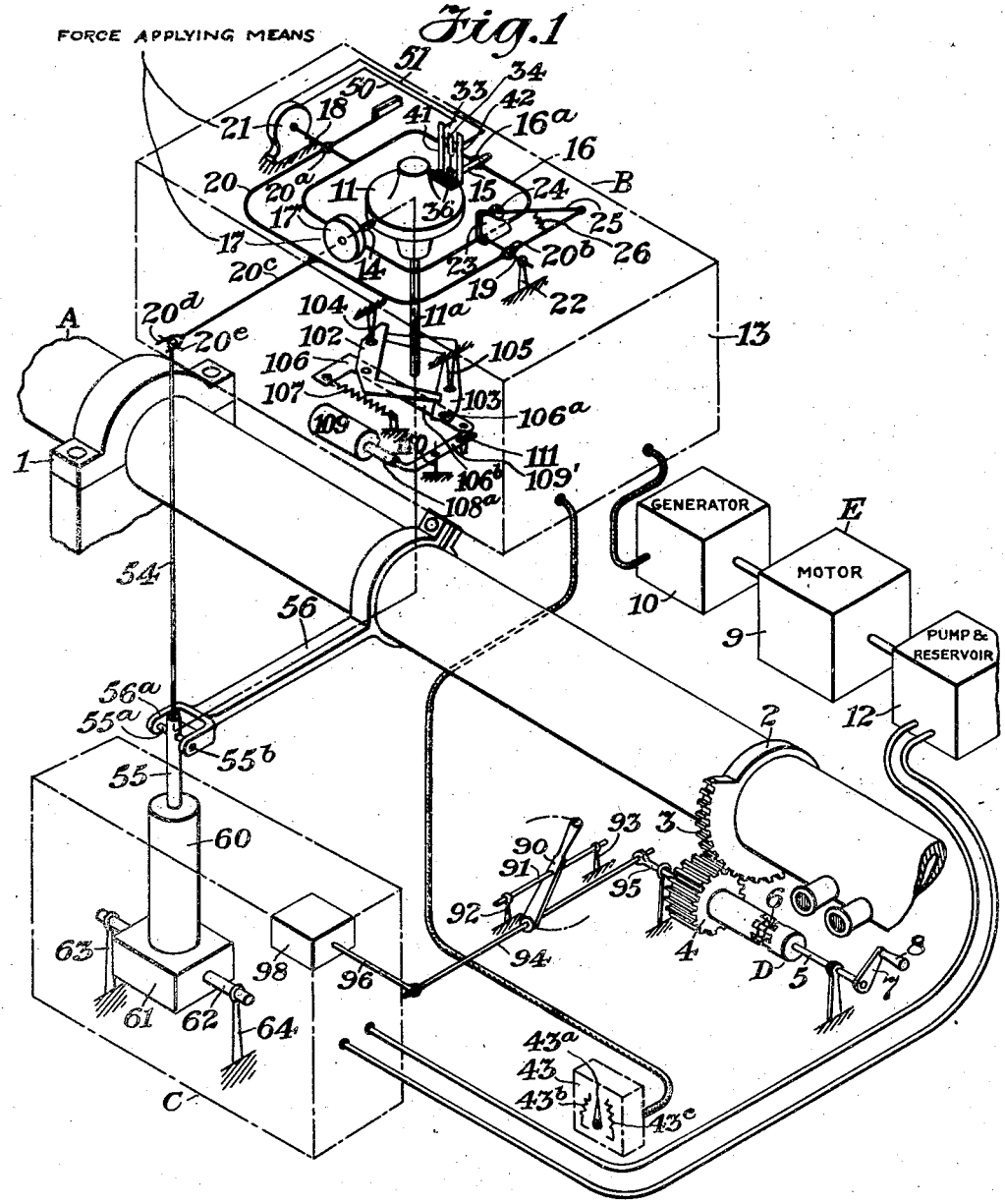

STABILIZING MECHANISM

Filed June 26, 1936  2 Sheets-Sheet 2

INVENTORS
Edward J. Poitras
James D. Tear
BY
THEIR ATTORNEY

Patented July 30, 1946

2,405,051

UNITED STATES PATENT OFFICE 2,405,051

STABILIZING MECHANISM

Edward J. Poitras, Jackson Heights, and James D. Tear, Great Neck, N. Y., assignors to Ford Instrument Company, Inc., Long Island City, N. Y., a corporation of New York Application June 26, 1936, Serial No. 87,596

4 Claims. (Cl. 33—46)

The invention herein disclosed relates to a stabilizing mechanism for stabilizing an object mounted upon a movable platform, such, for example, as the deck of a ship.

Certain objects mounted upon movable platforms are of such a nature that they must be rendered independent of the roll or pitch of the ship in order to be effective. Such an object, for example, is the range finder used in ordnance for determining the range of a target. As the ship rolls in the plane of the line of sight, the range finder must be continuously rotated in accordance with the roll of the ship in order to keep the target in view.

Heretofore, attempts have been made to stabilize such objects and particularly sighting devices such as a range finder. Such attempts, when made in conjunction with a gyroscopic stabilizing mechanism, take the form of stabilizing the optical parts of the instrument such, for example, as the optical prisms of the range finder. However, the stabilization of the optical parts of certain of such instruments has not been found to be satisfactory and it is an object of this invention to stabilize the instrument itself.

In accordance with the invention, a gyroscope support is mounted adjacent the object to be stabilized and a gyroscope is mounted in the support for movement about an axis parallel to the axis of rotation of the object to be stabilized and an axis perpendicular thereto. Mechanism is also provided for effecting rotation of the object in accordance with the relative movement of the gyroscope and its support about the axis parallel to the axis of rotation of the object. When applied to a range finder, for example, the range finder is thus rotated in accordance with the roll of the ship and is stabilized with respect thereto.

Such an application of a stabilizing mechanism embodying the invention is illustrated in the accompanying drawings in which:

Fig. 1 is a diagrammatic illustration of the stabilizing mechanism and its connection to a range finder;

Figure 3:
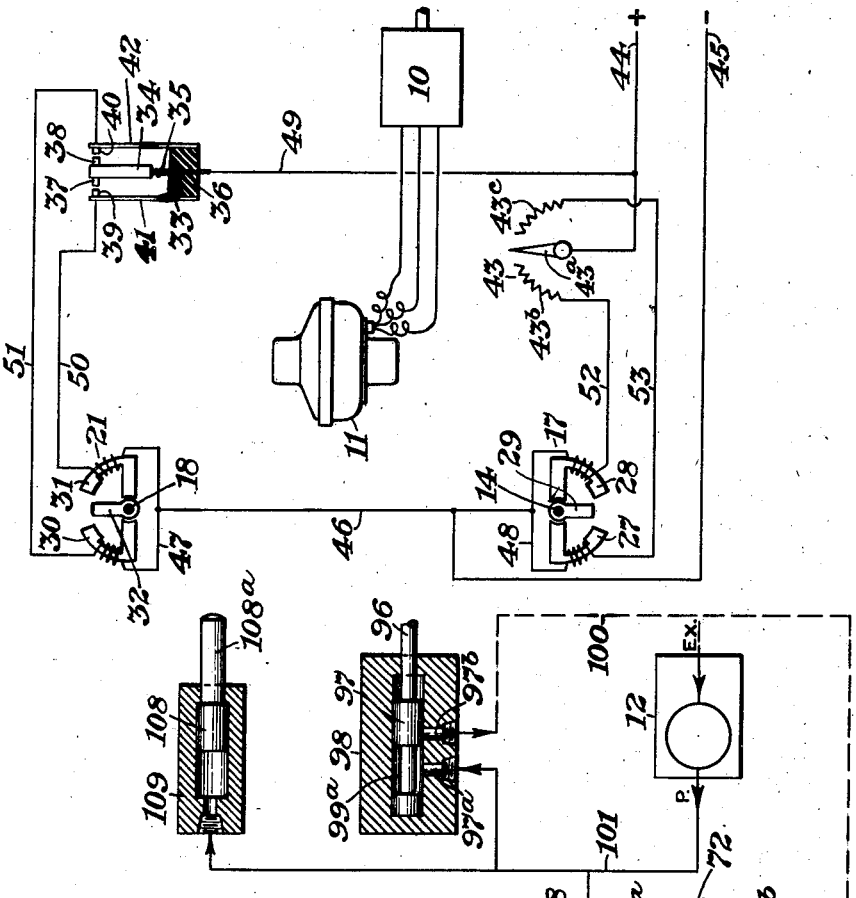
Fig. 3 is a diagrammatic illustration of the devices for applying precessional forces to the gyroscope and the electrical connections in the mechanism.

The system shown diagrammatically in Fig. 1 of the drawings is for stabilizing a range finder that is primarily used for determining the range of surface targets. The system disclosed includes the range finder A which is shown in part; a gyroscopic stabilizing mechanism B; and hydraulically operated follow-up mechanism C by means of which movements of the gyroscope about an axis is amplified and transmitted to, to effect movement of, the range finder A; a manual control means D for rotating the range finder, and a power unit E. The entire system including the several parts A, B, C, D, and E, is mounted upon a platform that is rotatable about a vertical axis. This platform (not shown in the drawings) is the usual platform upon which a range finder is mounted and it is rotatable about a vertical axis so that the axis of the range finder may be brought into a position perpendicular to the line of sight to the target.

The range finder A is, as is customary, mounted in bearing brackets, only one of which 1 is shown in the drawings. So mounted, the range finder is rotatable about its longitudinal axis. On the range finder, there is mounted a ring 2 that is secured to the range finder against rotation relative thereto. The ring 2 carries a segmental gear 3 which may be formed integral with the ring. This segmental gear 3 meshes with a pinion 4 mounted upon a shaft 5. A clutch 6 is provided by means of which a crank 7 secured to the shaft 5 may be connected to the pinion 4 so that the pinion 4 is rotated upon rotation of the shaft 5. The crank 7 has a handle 8 for the manual rotation of the crank. When the clutch 6 is engaged, rotation of the crank 7 effects rotation of the range finder about its longitudinal axis.

The power unit E includes an electric motor 9 that is supplied with current from the generators of the vessel upon which the mechanism is mounted. The motor 9 drives a generator 10 which supplies power for the operation of the gyroscope 11 of the gyroscopic stabilizing mechanism B. The motor 9 also drives a pump 12 which supplies oil under pressure for the operation of the hydraulically operated follow-up C.

The gyroscopic stabilizing mechanism includes a gyroscope support 13 shown in broken lines. Within the support the gyroscope 11 is mounted. The gyroscope has extending from diametrically opposite sides thereof trunnions 14 and 15. The trunnion 15 is journaled in a bearing 16a formed on a gimbal ring 16 and the trunnion 14 is journaled in the case of a precessional force applying means 17 that is mounted on the gimbal ring 16. Extending from opposite sides of the gimbal ring 16 and perpendicular to the axes of the trunnions 14 and 15, there are trunnions 18 and 19. The trunnion 19 extends through a bearing 20a on a U-shaped member 20 and into the case of a precessional force applying means 21 that is secured to the support 13. The trunnion 19 extends through a bearing 20b on the U-shaped member 20 and it is journaled in a bearing bracket 22. The U-shaped member is thus supported on the trunnions 18 and 19 which are journaled respectively in the case of the precessional force applying means 21 and the bearing bracket 22 which is mounted upon the support 13. On the ring 16, there is mounted a segmental constant rise cam 23 that is concentric with the trunnion 19. The cam 23 has a cam surface which rises in both directions from the bisector of the segment. Cooperating with this cam 23, there is a cam follower 24 mounted upon an arm 25 that is pivotally secured to the end of one leg of the U-shaped member 20. The cam follower 24 is held to the surface of the cam 23 by a spring 26 acting between the leg of the U-shaped member 20 and the arm 25. The cam and cam follower constitute a connection through which the U-shaped member 20 is normally maintained stationary with respect to the trunnions 18 and 19. The cam connection provides a relief for movements of these elements upon the application of opposing forces to these elements and, being a constant rise cam, upon such relative movement returns the ring 16 and the U-shaped member 20 to positional agreement when such condition ceases to exist. The axis of the trunnions 18 and 19 is parallel to the axis of rotation of the range finder A.

The precessional force applying means 17 and 21 are shown in detail in Fig. 3. The precessional force applying means 17 consists of the case 17' that is mounted upon the ring 16 and two arcuate electromagnets 27 and 28 mounted within the case. On the trunnion 14 extending from the gyroscope, there is mounted an armature 29 which cooperates with the opposed electromagnets 27 and 28. It will be seen that when the electromagnet 28 is energized a force will be exerted on the armature 29 proportional to the energizing current of the magnet 28. Likewise, when the magnet 27 is energized there will be a force on the armature 29 opposite in direction to the force on the armature which the magnet 28 produces. It will be understood of course that the armature 29 does not move under the influence of these magnets since in accordance with the phenomena of the gyroscope when a force is applied to the gyroscope about one axis, the gyroscope precesses about an axis perpendicular to the axis about which the force is applied. The precessional force applying means 21 is identical in all respects with the precessional force applying means 17 and includes similar electromagnets 30 and 31 and an armature 32 positioned to cooperate with the magnets and mounted upon the trunnion 18 extending from the gimbal ring 16.

The precessional force applying means 21 is controlled by an inverted pendulum arrangement 33 that is mounted upon the case of the gyroscope 11. This inverted pendulum is shown in detail in Fig. 3 and consists of a mass 34 mounted upon a leaf spring or reed 35 that is firmly secured in a block 36 mounted on the case of the gyroscope. The mass 34, at its upper end, carries two electrical contacts 37 and 38 on opposite surfaces thereof. These contacts 37 and 38 cooperate with contacts 39 and 40 mounted respectively upon metal strips 41 and 42 extending from and secured to opposite sides of the block 36. The precessional force applying means 17 is controlled by a directional rheostat 43.

The wiring diagram for these precessional force applying devices is illustrated in Fig. 3 in which the lines 44, 45 represent a supply of direct current. The line 45 is directly connected to one side of each of the electromagnets 27, 28, 30, and 31. This connection is made through a line 46 connected to the line 45, a branch line 47 connecting the line 46 to the electromagnets 30 and 31, and a branch line 48 connecting the line 46 to the magnets 27 and 28. The line 44 is connected through a line 49 to the inverted pendulum 34 and particularly the contacts 37 and 38 thereof. The contact 39 is connected by a line 50 to the coil of the electromagnet 31 and the contact 40 is connected by a line 51 to the coil of the electromagnet 30. The line 44 is also connected to the movable element 43a of the rheostat 43. A resistance element 43b of the rheostat is connected to the coil of the electromagnet 28 by a line 52, and a similar resistance element 43c is connected by a line 53 to the coil of the electromagnet 27.

From the above diagram, it will be seen that whenever the gyroscope, by virtue of unbalance, frictional forces, or the rotation of the earth, tilts about the trunnions 14 and 15, the pendulum 34 will engage either the contact 39 or 40, depending upon the direction in which the gyroscope tilts. The engagement of one or the other of these contacts will energize either the magnet 30 or 31 and effect a precessional force on the armature 32 and thus on the trunnion 18. This precessional force will be applied in a direction to cause the gyroscope to precess about the trunnions 14 and 15 in a direction to bring the pendulum 34 to a neutral position between the contacts, and thus bring the gyroscope axis to the effective vertical about axis 14—15. The rheostat 43 may be operated manually to effect a precessional force on the armature 29. The rheostat 43 is, in the operation of the mechanism, set manually to take care of unbalance of the gyroscope, friction at the sensitive bearings, and the earth's rotation.

The U-shaped element 20 carries an arm 20c that extends out from the gyroscope support 13 over the range finder A to a position above the follow-up mechanism C. The arm 20c has a bifurcated end 20d which carries a pin 20e extending across and secured to the arms of the bifurcated end section 20d. Pivotally secured to the pin 20e, there is a rod 54 which constitutes the control rod for the follow-up mechanism C. The follow-up mechanism C is such that movement of the rod 54, which requires practically no force to be moved and consequently does not place any reacting precessional force upon the gyroscope, effects movement of a power-actuated plunger rod 55 that is secured to the range finder A through a strap 56 mounted on and secured to the range finder against relative rotation with respect thereto. The strap 56 has a bifurcated bracket 56a extending therefrom and radially of the range finder. In this bifurcated bracket, there are journaled trunnions 55a and 55b which extend from diametrically opposite sides of the plunger 55. It is through these trunnions and the bracket 56 that the range finder is rotated about its longitudinal axis by the plunger rod 55.

The projections of the axis of the range finder, the axis 18—19 of the gyroscope, the pivot pin 20e and the trunnions 55a and 55b onto a plane perpendicular to the axes of the range finder form the intersections of lines forming a parallelogram. That is to say, the U-shaped element 20 and rod 20c, the rod 54 and the radial arm 56 form a parallel motion linkage. The gyroscope axis 14—15 is thus maintained parallel with the line of sight on a surface target.

Figure 2:
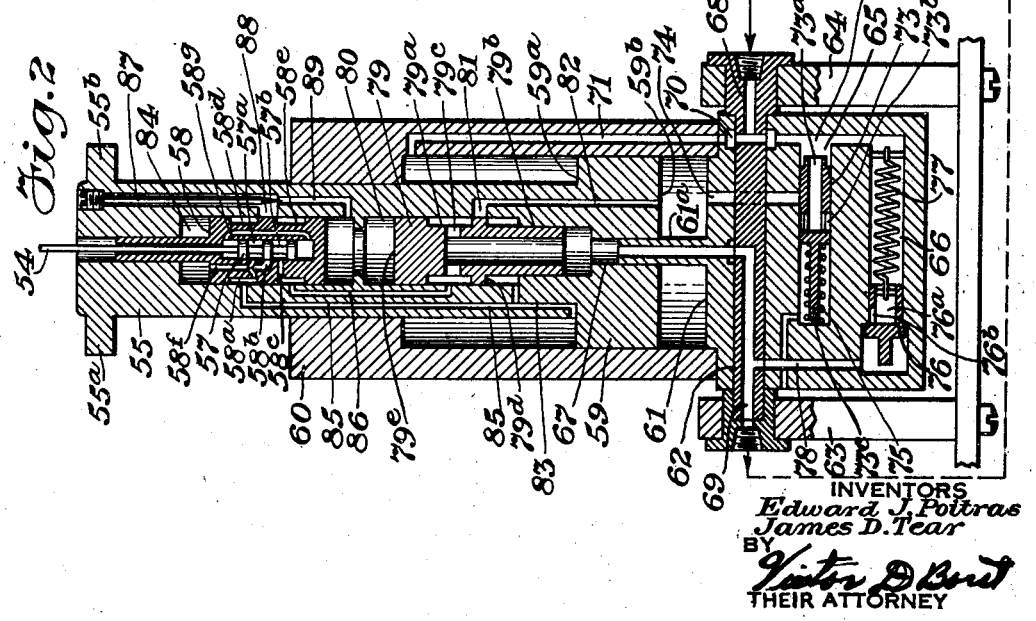
Fig. 2 is a longitudinal, sectional elevation of the follow-up mechanism for rotating the range finder in accordance with the relative movement of the gyroscope and its support.

The arrangement of the hydraulic follow-up mechanism is illustrated in detail in Fig. 2 of the drawings. The rod 54 extends through a longitudinal opening in the plunger rod 55 and is connected to a piston valve 57 that is slidably mounted in a combined plunger and piston valve 58. The plunger 58 is mounted in a central bore of the plunger rod 55. The plunger 55 has on its lower end a piston head 59, one face of which 59a is one-half the area of the opposite or lower face 59b. It is from the face 59a that the plunger rod 55 extends and this plunger reduces the area of the face 59a. The plunger 55 and the piston 59 thereon are mounted in a block 60.

The block 60 forms a cylinder for the piston 59, and a block 61 on which the block 60 is mounted forms an end wall for the cylinder. The block 61 is pivotally mounted on a shaft 62 that is mounted in brackets 63 and 64. Within the block 61 there is a relief valve chamber 65 and a constant pressure valve chamber 66. A lateral hollow arm 61a extends from the surface of the block 61 and into a bore 67 in the piston 59. Oil under pressure is introduced into a passage 68 formed in the end of the shaft 62 mounted in the bracket 64, and the oil passes from the follow-up mechanism through an exhaust passage 69 formed in the opposite end of the shaft 62. The passage 68 communicates with a circumferential groove 70 in the block 61 which also communicates with a passage 71 in the block 60 and a passage 72 in the block 61. The passage 72 is connected in parallel to the valve chambers 65 and 66. In the valve chamber 65, there is a valve 73 that controls communication between the passage 72 and a passage 74 communicating with the chamber below the piston 59. The valve 73 has a longitudinal passage 73a that communicates with radial passages 73b. A spring 75, surrounding a limiting pin 73c extending from the end of the valve, acts to move the valve to the right, from the position shown in Fig. 2, to place the radial passage 73b in alignment with the passage 74. The valve is moved against the action of the spring to the position shown by oil under pressure in the passage 72.

A constant pressure valve 76 is slidably mounted in the valve chamber 66. The pressure of the oil in the passage 72 acts against the action of a spring 77 to move the valve to the left from the position shown. The valve 76 has a longitudinal passage 76a and a radial passage 76b communicating with the passage 76a. When the valve is moved to the left from the position shown, the passage 72 is placed into communication with a passage 78 connected to the exhaust passage 69. In this way the oil in the passage 72 is maintained at a constant pressure.

Oil under a constant pressure is thus supplied through the passage 71 to the chamber above the piston and acts to move the piston downwardly in the cylinder. The action of the oil on the upper surface of the piston is resisted by oil in the chamber below the piston and movement of the piston 59 and its associated plunger or piston rod 55 is controlled by admitting oil under pressure to and exhausting oil from the chamber below the piston 59. For this purpose, there is provided a hydraulically operated valve 79 mounted in a chamber 80 in the piston rod 55. The valve 79 has a reduced section 79a and a reduced hollow extension 79b. Radial passages 79c at the reduced section 79a communicate with the interior of the hollow extension 79b which also communicates with the passage in the arm 61a and thus the exhaust passage 69. A port 81 controlled by the valve communicates with the chamber below the piston through a passage 82 in the plunger rod 55 and piston 59. Oil under pressure is delivered to the valve chamber 58d through a passage 83 communicating with the chamber above the piston 59 and the oil acts on the annular surface of the shoulder 79d of the valve formed by the reduction of the valve to form the extension 79b. The area of the surface 79d is equal to one-half of the end surface 79e of the valve 79 on which oil under pressure acts to oppose the pressure of the oil on the surface 79d. The oil between the valve 79 and the plunger 58 is thus maintained at a pressure of one-half the pressure of the supply. It will be seen that when the valve 79 is moved downwardly from the position shown in Fig. 2, the port 81 will be placed in communication with the exhaust and the pressure in the lower chamber will be reduced and the piston 59 will move downwardly. Likewise, if the valve is moved upwardly from the position shown, the port 81 will be placed into communication with the passage 83 and oil under pressure will flow through the passage 82 to the lower chamber and effect an upward movement of the piston 59.

Movement of the valve 79 follows movement of the plunger 58 which is controlled by the valve 57. The valve 57 has two reduced sections 57a and 57b and this valve controls communication between ports 58a, 58b and 58c in the plunger 58.

The plunger 58 has two reduced sections 58d and 58e. The port 58b communicates with a chamber 84 above the plunger 58 through a passage 58f. The port 58a communicates through a passage with the chamber formed by the reduced section 58d of the plunger and through that chamber with a passage 85 that communicates with the passage 83. Oil under pressure is thus delivered to the chamber formed by the reduced section 58d through the passage 85. The port 58c communicates with the chamber formed by the reduced section 58e which in turn communicates with a passage 86 through the plunger or piston rod 55. The passage 86 also communicates with the chamber formed by the reduced section 79a of the valve 79 and through the radial passages 79c of the valve 79 with the exhaust passage 69. A passage 58g connects the chambers formed above and below the valve 57 in the plunger 58 so as to permit free movement of the valve.

From the description of these ports and passages and the valve 57 it will be seen that if the valve 57 is moved upwardly from the position shown in Fig. 2, the port 58c will be placed into communication with the port 58b. Oil under pressure will thus flow from the chamber 84 to the exhaust and since the plunger in the chamber 84 is raised, the pressure of the oil between the plunger 58 and the valve 79 is slightly reduced and the pressure acting upon the surface 79d of the valve 79 will cause the valve 79 to move upwardly following the movement of the plunger 58 with the result that the piston 59 in the manner heretofore described will move upwardly. The movement of the plunger 58 will be equal to the movement of the valve 57 since as the plunger moves upwardly it will reach a position in which communication between the ports 58b and 58c will be cut off and there will be no further movement of the plunger 58. Due to the hydraulic connection of the fluid in the chamber above the valve surface 79e, the movement of the valve 79 and the piston 59 will be equal to the movement of the valve 57. When the valve 57 is moved downwardly the port 58b is placed into communication with the port 58a and oil under pressure flows to the chamber 84. The increase in pressure in the chamber 84 causes a downward movement of the plunger 58 and through the fluid between the plunger and the valve 79 effects downward movement of the valve 79. The movement of the plunger 58 and valve 79 will correspond to the movement of the valve 57. The piston 59 will likewise be caused to move in proportion to the movement of the valve 57, as described above.

With this arrangement there would be a slight lag between the movement of the valve 57 through the valve stem 54 and the movement of the range finder when the piston 59 had appreciable velocity. This is due to the opening of port 81, and consequent movement of both 79 and 58 from their neutral positions, to pass the oil into or from the chamber below the piston 59. In order to remove this lag there is provided an advancing valve 87. The advancing valve 87 is a needle valve and the needle valve controls communication between a port 88 formed in the plunger rod 55 and a passage 89, the passage 89 communicating with the port 88 and the chamber between the plunger 58 and the valve 79. Upon movement of the plunger 58 the port 88 is placed into communication with the chamber formed by the reduced section 58d or the chamber formed by the reduced section 58e of the plunger 58 depending upon the direction of movement of the plunger from a neutral position. If the plunger moves upwardly the chamber formed by the reduced section 58e is placed into communication with the port 88 and oil flows from the chamber between the plunger 58 and the valve 79 to the exhaust passage 86 thus reducing the pressure in this chamber and augmenting the effect of the upward movement of the plunger. On the other hand, if the plunger moves downwardly the port 88 is placed into communication with the chamber formed by the reduced section 58d and oil under pressure flows from the pressure port 58a to the chamber between the plunger 58 and the valve 79 thus causing the valve 79 to move down further than it otherwise would if the effect of the plunger 58 were not augmented by this increase in fluid flowing into the chamber between the plunger 58 and the valve 79. The valve 87 is set arbitrarily to produce the most satisfactory conditions for the particular installation.

It will be apparent that the piston rod 55 and consequently the range finder, are thus moved in accordance with the movement of the valve stem or rod 54 and consequently in accordance with the movement of the gyroscope relative to its support. Since the gyroscope is stable in space, the range finder will be moved relative to its support so that it remains stable in space about its axis.

To selectively connect the range finder for manual operation through the handle 8 or to effect the automatic stabilization by the gyroscope through the mechanism described above, there is provided a manual lever 90. The lever is mounted upon a shaft 91 that is journaled in bearings 92 and 93. The upper end of the lever is formed as a handle and the lower end of the lever has a pin 94 extending therefrom. To this pin a rod 95 is connected which is connected to the clutch 6 and upon movement of the handle, from the position shown, to the left, the rod 95 effects the engagement of the clutch 6.

Also connected to the pin 94 there is a valve rod 96 which operates a valve 97 mounted in a valve block 98. The valve 97 may be termed a selector valve and is for the purpose of cutting out the operation of the hydraulic follow-up. The valve 97 and its interconnection with the system is shown in detail in Fig. 2. This valve is a piston valve having a reduced section 99a of sufficient length to connect ports 97a and 97b in the valve block. The ports 97a and 97b are connected across the pump 12 so that when these two ports are in communication the pump is short-circuited, that is, the high pressure side of the pump is connected to the exhaust side of the pump and oil under pressure is not delivered to the hydraulic follow-up mechanism. This connection is illustrated diagrammatically in Fig. 2 wherein the broken line 100 indicates a line of passages which are connected to the exhaust side of the pump and the solid line 101 indicates a line of passages connected to the high pressure side of the pump. It will be observed that the high pressure side of the pump connects with the passage 68 and the low pressure side of the pump connects with the passage 69 in the hydraulically operated follow-up. Likewise, the line 101 connects with the port 97a of the valve block 97 and the line 100 connects with the port 97b. When the valve is in the position illustrated in Fig. 2 the port 97b is cut off from communication with the port 97a. Consequently oil under pressure is supplied for the operation of the follow-up mechanism. When the lever 90 is swung about its pivot to the left from the position illustrated, the valve 97 is moved to the right from the position shown in Fig. 2 and the port 97a is placed into communication with the port 97b. The pump is thus short-circuited and the hydraulic follow-up mechanism does not operate.

It will be observed that when the selector valve is moved so as to cut out the hydraulically operated follow-up, the valve 73 moves to a position to place the passage 74 and consequently the chamber below the piston 59 into communication with the passage 72. Oil in the chamber below the piston 79 thus flows from this chamber and does not present any resistance to the manual operation of the range finder.

When the selector valve is operated so as to provide for the manual operation of the range finder, the gyroscope is captured to prevent a free swinging movement of the gyroscope. The mechanism for capturing the gyroscope is illustrated in Fig. 1 and consists of two L-shaped levers 102 and 103. The L-shaped lever 102 is mounted to swing about a pivot 104 in the gyroscope support and the lever 103 is mounted to move about a pivot 105. At approximately the apex of the angle formed by the arms of the lever 102, this lever is pivotally secured to an L-shaped bar 106 and the lever 103 is similarly pivoted to this bar 106 at 106a. The bar 106 is slidably mounted on the gyroscope support for movement longitudinally of the long arm 106b thereof. A spring 107 urges the bar in a direction such as to move the arms 102 and 103 about their pivots 104 and 105 in a direction which closes the gap between these arms. A pin 11a extending downwardly from the gyroscope extends between the arms 102 and 103 and when the bar 106 moves under the action of the spring 107 the arms 103 and 104 move about their pivots and clamp the pin 11a, thus capturing the gyroscope. The arms 102 and 103 are moved in the opposite direction by a plunger 108 illustrated in detail in Fig. 2.

The plunger 108 is slidably mounted in a block 109 mounted in the gyroscope support. When the selector valve is moved to the position shown in Fig. 2, oil under pressure is admitted to the block 109 behind the plunger 108 and forces the plunger outwardly of the block. The plunger rod 108a is connected to one end of a lever 109' that is pivoted at 110 and the other end of the lever is connected to a pin 111 extending from the bar 106. Outward movement of the plunger 108 effects movemet of the bar 106 in a direction opposite to that in which the spring 107 tends to move it. When the selector valve is positioned so as to supply oil under pressure, the plunger 108 is thus actuated to move the levers 102 and 103 about their pivots and release the pin 11a extending from the gyroscope.

From the above description of the embodiment disclosed in the drawings it will be seen that the mechanism herein disclosed is suitable for stabilizing a range finder or any other object in level, that is, about an axis perpendicular to the line of sight. In operation, as the ship rolls, the person operating the range finder may, as he picks up the target on the roll of the ship, throw the lever 90 into the automatic control. If this is done the range finder will become stabilized on the target and become independent of the roll of the ship.

It will be obvious that various changes may be made by those skilled in the art in the embodiment of the invention illustrated in the drawings and described above within the principle and scope of the invention as expressed in the appended claims.

We claim:

1. In a stabilizing mechanism for stabilizing a range finder mounted on a movable platform and rotatable about its own axis, the combination comprising a gyroscope support mounted adjacent the range finder, a gyroscope mounted in the support for movement about an axis parallel to the axis of rotation of the range finder and an axis perpendicular thereto, and means for effecting rotation of the range finder in accordance with relative movement of the gyroscope and its support about the axis parallel to the axis of rotation of the range finder including a cylinder pivotally mounted about an axis parallel to the axis of the range finder, a plunger within the cylinder, an arm connected to the range finder and the plunger, and means actuated by movement of the gyroscope for controlling the flow of hydraulic medium to the cylinder.

2. In a stabilizing mechanism for stabilizing a range finder mounted on a movable platform and rotatable about its own axis, the combination comprising a gyroscope support mounted adjacent the range finder, a gyroscope mounted in the support for movement about an axis parallel to the axis of rotation of the range finder and an axis perpendicular thereto, and means for effecting rotation of the range finder in accordance with relative movement of the gyroscope and its support about the axis parallel to the axis of rotation of the range finder including a cylinder pivotally mounted about an axis parallel to the axis of the range finder, a plunger within the cylinder, an arm connected to the range finder and the plunger, a valve within the plunger for controlling the flow of hydraulic medium to the cylinder, and means for actuating the valve relative to the plunger in accordance with movement of the gyroscope.

3. In a stabilizing mechanism for stabilizing a range finder mounted upon a movable platform and rotatable about its own axis, the combination comprising a gyroscope support mounted above the range finder, a gyroscope mounted in the support for movement about an axis parallel to the axis of rotation of the range finder and an axis perpendicular thereto, the gyroscope being mounted so that its spin axis intersects the axis of the range finder, and means for effecting rotation of the range finder in accordance with relative movement of the gyroscope and its support about the axis parallel to the axis of the range finder including a cylinder pivotally mounted about an axis parallel to the axis of the range finder, a plunger within the cylinder, an arm connected to the range finder and pivotally secured to the plunger, a valve within the plunger for controlling the flow of a hydraulic medium to the cylinder, a valve stem, and an arm pivotally mounted about the axis of the gyroscope and movable therewith and pivotally secured to the valve stem.

4. In a stabilizing mechanism for stabilizing a range finder mounted upon a movable platform and rotatable about its own axis, the combination comprising means for stabilizing the range finder including a gyroscope support mounted adjacent the range finder and movable about an axis parallel to the axis of the range finder, a gyroscope mounted in the support for movement about an axis perpendicular to the axis of movement of the support, means for applying a precessional force to the gyroscope to effect precession of the gyroscope about its axis of movement and control means therefor including a pendulum, means for applying a precessional force to the gyroscope to effect precession of the gyroscope about the axis of the gyroscope support and manually operative control means therefor, power-actuated means for effecting rotation of the range finder and control means therefor operated by movement of the gyroscope support relative to said platform.

EDWARD J. POITRAS.
JAMES D. TEAR.